Feb. 13, 1951 K. W. CROSSMAN ET AL 2,541,503

DOFFING MECHANISM FOR SPINNING MACHINES

Filed Jan. 18, 1949 10 Sheets-Sheet 1

WITNESSES

A. J. Brittingham

Hubert Fuchs

INVENTORS:
Kenneth W. Crossman &
Jack Numerof,

BY Paul & Paul

ATTORNEYS.

Feb. 13, 1951 K. W. CROSSMAN ET AL 2,541,503

DOFFING MECHANISM FOR SPINNING MACHINES

Filed Jan. 18, 1949 10 Sheets-Sheet 2

WITNESSES

A. J. Brittingham

Hubert Fuchs

INVENTORS:

Kenneth W. Crossman &

Jack Numerof,

BY Paul & Paul

ATTORNEYS.

DOFFING MECHANISM FOR SPINNING MACHINES

Filed Jan. 18, 1949 10 Sheets-Sheet 3

WITNESSES
A. J. Brittingham
Hubert Fuchs

INVENTORS:
Kenneth W. Crossman &
Jack Numerof,
BY Paul & Paul
ATTORNEYS.

DOFFING MECHANISM FOR SPINNING MACHINES

WITNESSES

A. J. Brittingham

Hubert Fuchs

INVENTORS:

Kenneth W. Crossman & Jack Numerof,

BY Paul & Paul

ATTORNEYS.

DOFFING MECHANISM FOR SPINNING MACHINES

Filed Jan. 18, 1949

INVENTORS:
Kenneth W. Crossman &
Jack Numeroff,
BY Paul & Paul
ATTORNEYS.

DOFFING MECHANISM FOR SPINNING MACHINES

Filed Jan. 18, 1949 10 Sheets-Sheet 6

INVENTORS:
Kenneth W. Crossman &
Jack Numerof,
BY Paul & Paul
ATTORNEYS.

Feb. 13, 1951 K. W. CROSSMAN ET AL 2,541,503

DOFFING MECHANISM FOR SPINNING MACHINES

Filed Jan. 18, 1949 10 Sheets-Sheet 7

INVENTORS:
Kenneth W. Crossman &
Jack Numerof,
BY Paul & Paul
ATTORNEYS.

INVENTORS:
Kenneth W. Crossman &
Jack Numerof,
BY Paul & Paul
ATTORNEYS.

INVENTORS:
Kenneth W. Crossman &
Jack Numerof,
BY Paul & Paul
ATTORNEYS.

INVENTORS:
Kenneth W. Crossman &
Jack Numerof,
BY Paul & Paul
ATTORNEYS.

Patented Feb. 13, 1951 2,541,503

UNITED STATES PATENT OFFICE 2,541,503

DOFFING MECHANISM FOR SPINNING MACHINES

Kenneth W. Crossman, Abington, and Jack Numerof, Philadelphia, Pa., assignors to The Edwin H. Fitler Company, Philadelphia, Pa., a corporation of Pennsylvania Application January 18, 1949, Serial No. 71,488

8 Claims. (Cl. 57—52)

This invention relates to spinning machines, roving frames and twisters. More specifically, it is concerned with spinning machines designed for the production of relatively coarse yarns or cords such, for example, as are intended to be subsequently incorporated into ropes, hawsers, etc. Spinning or twisting machines of the type particularly referred to are ordinarily equipped with manually operable doffing mechanisms whereby, upon stoppage of the machines after each spinning operation, trays supporting multiple filled spools or bobbins are removed from the traverses and ejected from the machines, and substitute trays with empty spools are at the same time transferred to and positioned upon the traverses in preparation for a succeeding spinning operation. These spool trays are of considerable weight, and therefore a great amount of manual effort is required to operate the doffing mechanisms in effecting the interchange of the trays. Accordingly, with machines of the above type, as ordinarily constructed, it is necessary to employ robust attendants. The doffing so accomplished manually is at best slow and, moreover compels relatively long idle periods of the machines with consequent reduction in their output.

The chief aim of the present invention is to overcome the foregoing drawbacks, which objective is realized in practice, as hereinafter more fully set forth, through provision of power means by which the doffing mechanisms of the machines are automatically operated to carry out the doffing cycles quickly and efficiently and without expenditure of any exertion whatever on the part of the machine attendants.

Other objects and attendant advantages will appear from the following detailed description of the attached drawings, wherein Fig. 1 is a broken out view, in front elevation, of a spinning or twisting machine conveniently embodying the invention.

Figure 3:
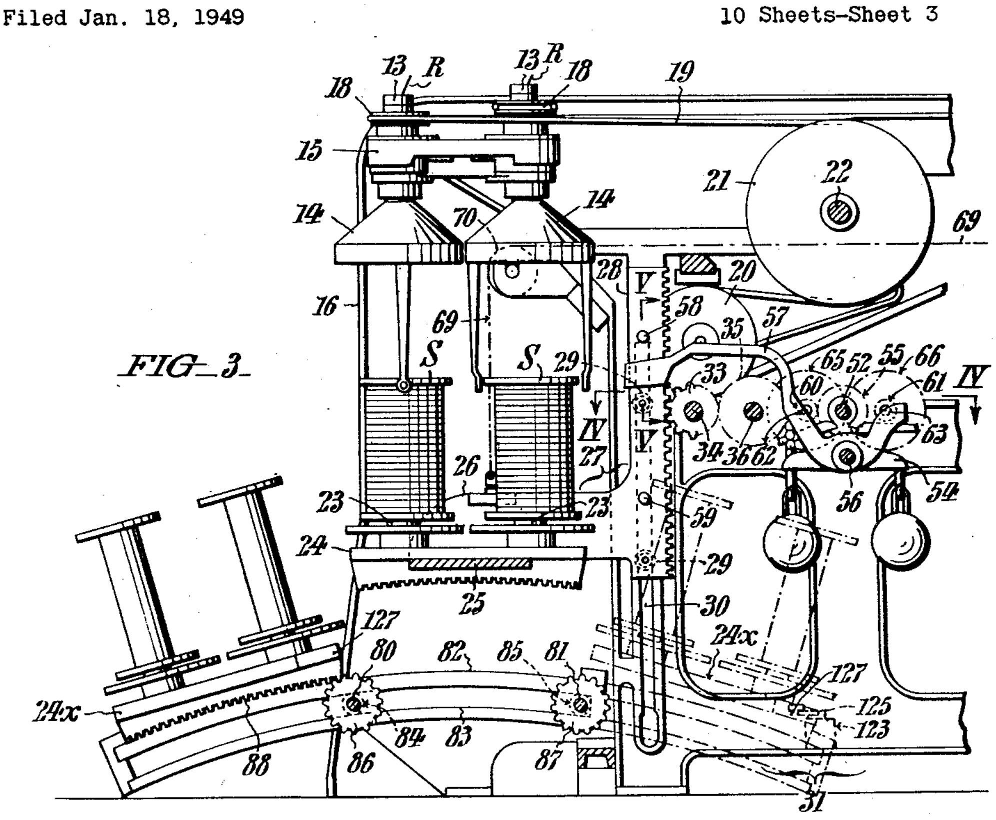
Fig. 3 is a fragmentary view in cross section taken as indicated by the angled arrows III—III in Fig. 1.
Figure 6:
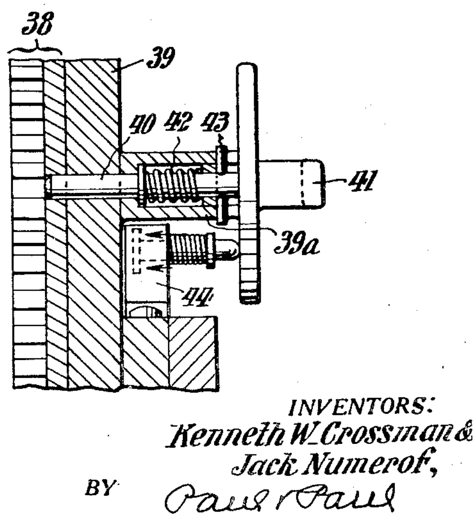
Figures 4, 7, 8:
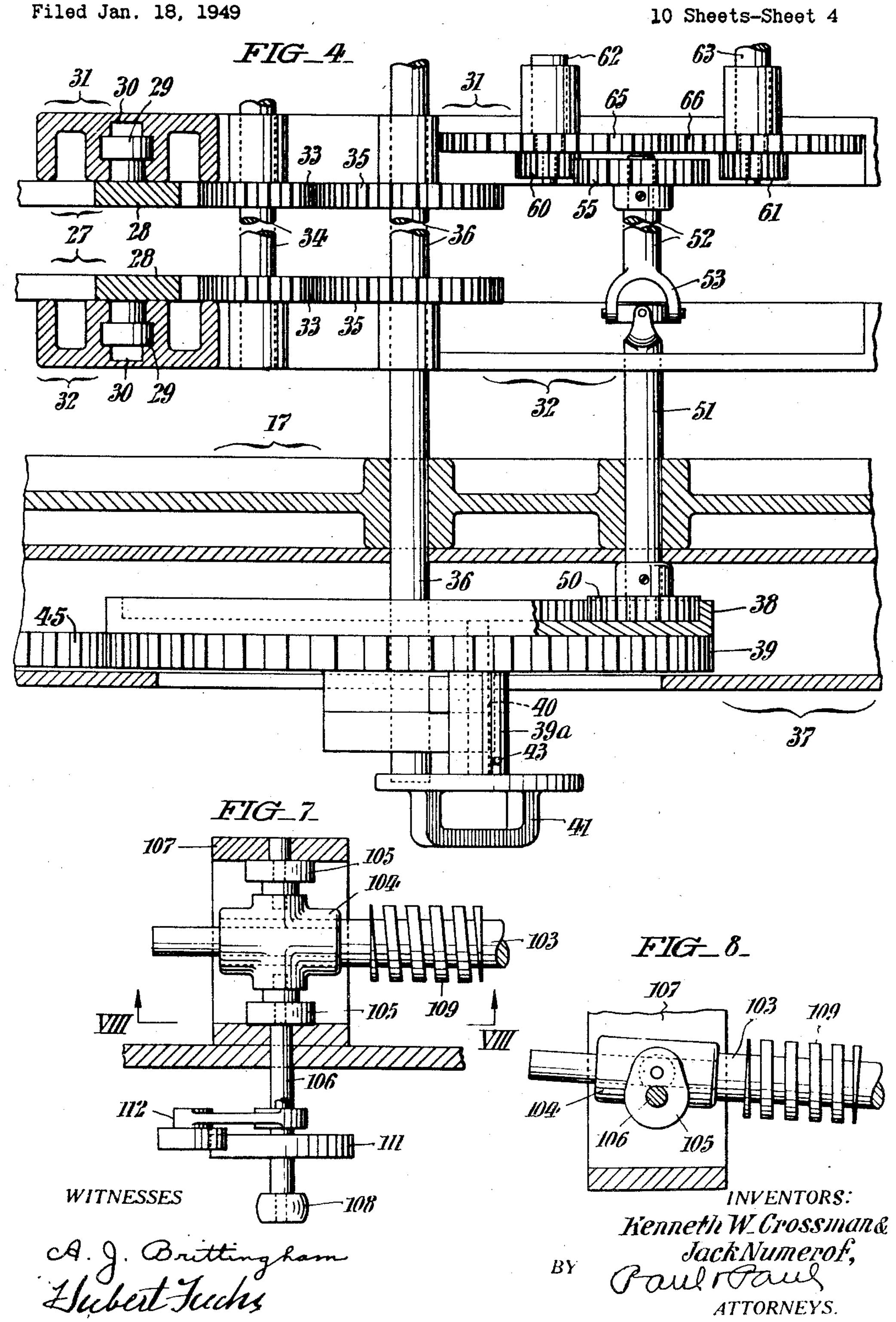
Fig. 4 is a broken out fragmentary view in horizontal section taken as indicated by the angled arrows IV—IV in Fig. 3.
Fig. 7 is a fragmentary detail section taken as indicated by the angled arrows VII—VII in Fig. 2.
Fig. 8 is a fragmentary section taken as indicated by the angled arrows VIII—VIII in Fig. 7.

In the illustrated spinning or twisting machine, the textile fiber slivers indicated at R are drawn forwardly from suitable individual sources of supply (not shown) at the rear of the machine and then across the top thereof by rollers 10 and 11 to arcuate smoothing guides 12. By these guides the slivers are directed downwardly of the front of the machine into the axial bores of the upwardly extending spindles 13 of a group of staggeringly arranged fliers 14. The flier spindles 13 are rotatively borne in a beam 15 which extends longitudinally of the front of the machine at the top between its side frames 16 and 17, and secured to the upper protruding ends of said spindles are sheaves 18, see Fig. 3. Through the medium of a rope belt 19 trained about the sheaves 18, an idler pulley 20 and a drive pulley 21 which latter is mounted on a longitudinal extending shaft 22, the required rotary movement is imparted to the fliers 14 to twist the slivers into yarns and to concurrently wind the yarns upon individual bobbins or spools indicated at S. As shown, the spools S are impaled upon studs 23 which are centered to correspond with the staggered arrangement of the flier axes, on a tray 24 supported at its opposite ends upon inwardly directed lateral ledges 25 on the forwardly extending arms 26 of a pair of angular brackets 27 which together constitute the traverse of the machine. The upright arms 28 of the brackets 27 are provided with rollers 29 which engage vertical guide ways 30 in supplementary transverse frames 31 and 32. The mechanism for actuating the traverse in spinning includes spur wheels 33 which are affixed to another longitudinal shaft 34 and which mesh with rack teeth on the upright arms 28 of the brackets 27. Meshing in turn with the spur wheels 33 are similar toothed wheels 35 on a parallel shaft 36 which extends out through a bearing on the side frame 17, see Fig. 4, and also through a gear housing 37 attached to said frame. Within the housing 37 is an auxiliary mechanism for actuating the traverse during doffing. This auxiliary mechanism includes an internal gear wheel 38 and a spur wheel 39 positioned alongside each other on the shaft 36, the former of said wheels being freely mounted and the latter fixed on said shaft. During the normal operation of the machine, the internal gear wheel 38 is connected to the spur wheel 39 by means of a clutch bolt 40, see Fig. 6, which is axially slidable in a boss 39a on the last mentioned gear. At its outer end, the clutch bolt 40 has a grasp handle 41 whereby it can be retracted against the action of a compression spring 42 to free the internal gear wheel 38, and at the same time be locked out by turning it through right angles to position a cross pin 43 which normally occupies diametrical notches in the boss 39a, over the end of said boss. Withdrawal of the clutch bolt 40 as just explained is attended by the automatic closing of a spring-influenced electric safety switch 44 which will be again referred to later. Also within the housing 37 is a transfer carriage actuating mechanism which comprises a gear train with spur wheels 45, 46 and 47 (Fig. 2) whereby rotary motion is transmitted from the spur wheel 39 on shaft 36 to a shaft 48 which will be again referred to hereinafter.

Figure 5:
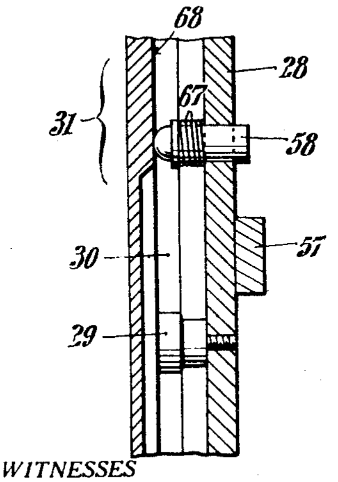
Figs. 5 and 6 are fragmentary detail sections taken as indicated by the angled arrows V—V and VI—VI in Figs. 3 and 2 respectively.

Meshing with the internal gear wheel 38 is a spur pinion 50 at the outer end of two part shaft whereof the sections 51 and 52 are connected by a universal coupling 53. As shown, the section 51 passes through a bearing on the side frame 17 while the distal end of the section 52 passes through the upward arm of a counter weighted oscillating member 54 (Fig. 3) and carries a spur pinion 55. The oscillating member 54 is secured to a horizontal rock shaft 56 together with an arm 57 arranged to be alternatively engaged by pins 58 and 59 vertically spaced on the upright arm 28 of one of the traverse brackets 27. As the shaft 56 is rocked, the spur pinion 55 is alternately brought into engagement with spur pinions 60 and 61 respectively on oppositely rotating shafts 62 and 63 which are caused to revolve in unison through intermeshing spur wheels 65 and 66 respectively on them. For a reason which will later be made apparent, the pin 58 is axially free in a guide hole in the upright arm 28 of the traverse bracket 27 and subject to a compression spring 67 (see Fig. 5) whereby its inner end is maintained in engagement with a cam surface 68 on the auxiliary transverse frame 31. Connected at one end to the horizontal arms 26 of the traverse brackets 27 are chains 69 which pass over guide sprockets 70 and 71 to the rear of the machine for suspension of counterbalance weights such as shown at 72 in Fig. 2 from their opposite ends. The mechanism just described constitutes the means by which the traverse is reciprocated vertically relative to the flyers during the spinning.

Figure 1:
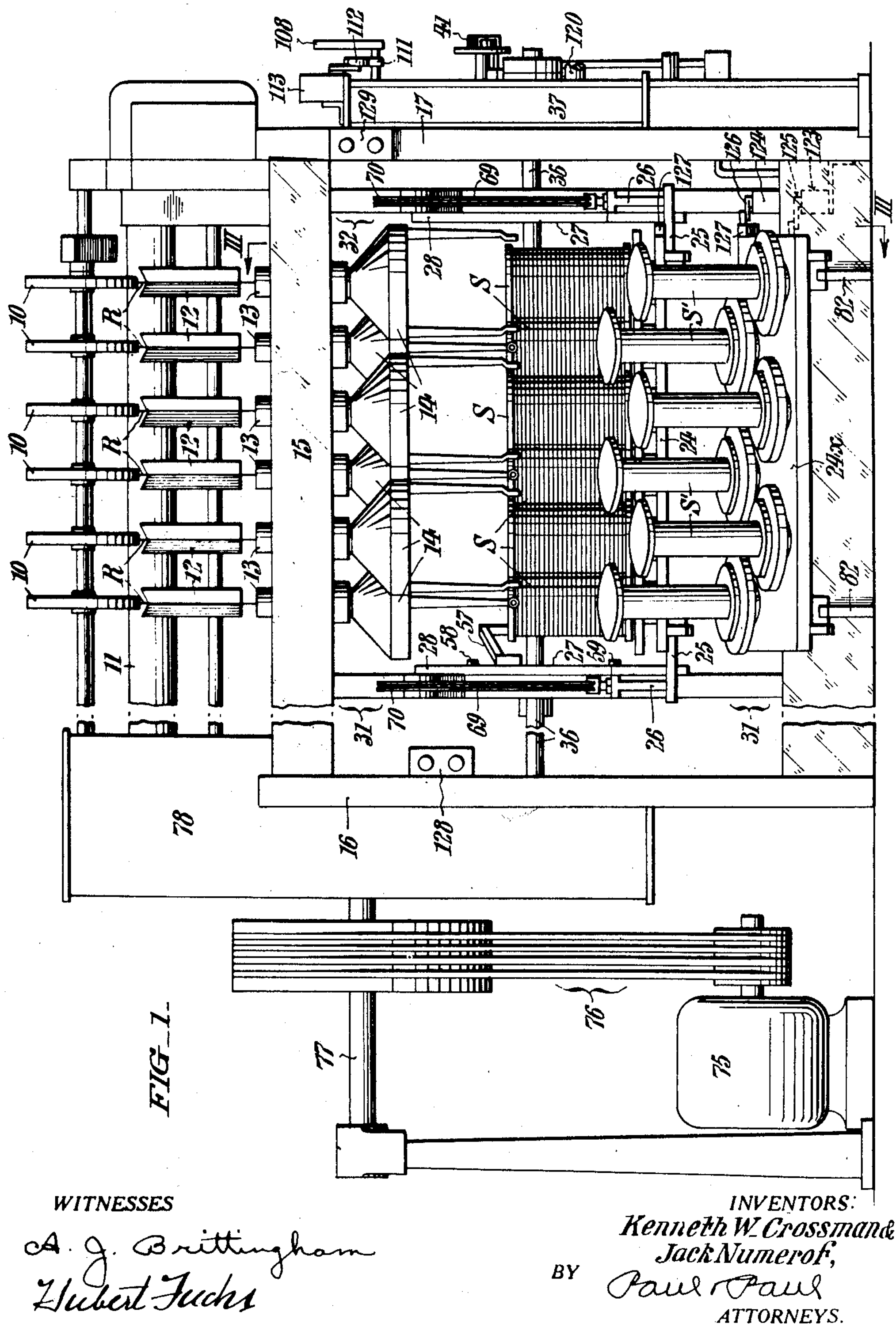

The machine is powered by a single phase A. C. electric motor indicated at 75 in Fig. 1 through a pulley belt connection 76 with a main drive shaft 77 which extends into a housing 78 attached to the side frame 16. Within the housing 78 is a suitable transmission mechanism (not shown) from which the draw rollers 10 and 11, the shaft 22 for the rope pulley 21 of the flier drive, and the shaft 36 for the traverse actuating mechanism all derive their motion. The doffing means is located at the bottom of the machine beneath the fliers 14, and as shown, comprises a pair of transversely spaced longitudinal shafts 80 and 81, and transfer carriage bars 82 for a supplemental or substitute spool tray 24x. The bars 82 are arcuate in configuration and slotted as at 83, for guidance to longitudinal movement, by rollers 84 and 85 free on the shafts 80 and 81. The carriage bars 82 are spaced to support the tray 24x from beneath adjacent opposite ends, and are relied upon to carry said tray from the fully retracted or doffing position of Figs. 2 and 3 to the dot-dash line inward position of Fig. 3 beyond the path of the traverse. Such movements are induced in the transfer carriage bars 82 by actuating mechanism including spur pinions 86 and 87 on the shafts 80 and 81 which pinions are adapted to successively engage with gear racks 88 at the bottom of the tray 24x. The shafts 80 and 81 are rotated in unison and in the same direction by gearing in the lower part of the housing 37. As shown, this gearing includes similar spur wheels 89 and 90 respectively on the shafts 80 and 81 which mesh with an interposed spur wheel 91. From Fig. 2 it will be observed that the spur wheel 91 is rotated through a train of spur wheels 92, 93, 94, 95, and 96 from a shaft 97 which, in the machine as originally designed, is intended to be turned manually by application of a hand crank thereto. It is to be understood that the machine may have several multiple spool sections such as described and of which only one is illustrated in Fig. 1 of the drawings.

Figure 2:
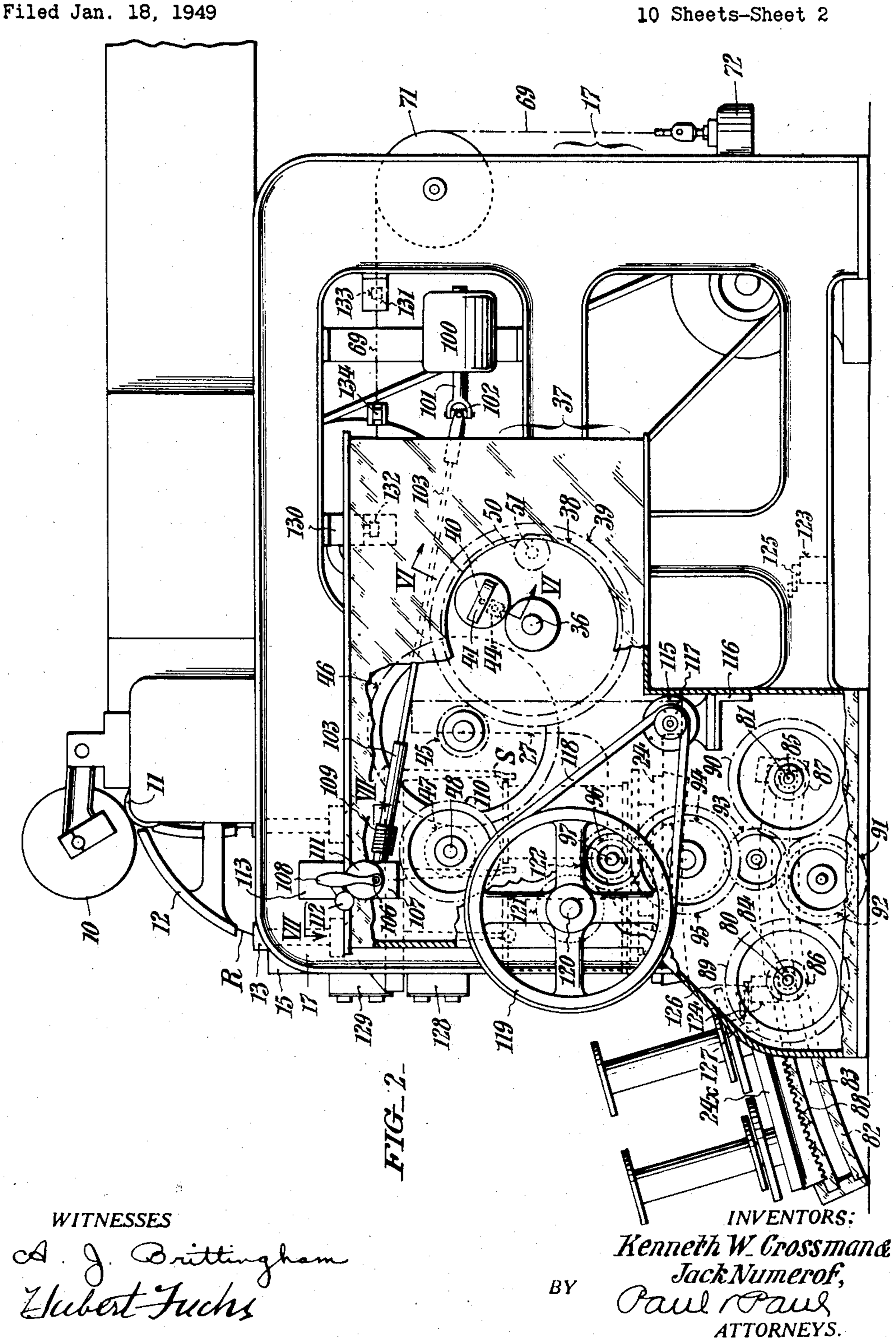
Fig. 2 is a view of the machine in end elevation as seen from the right of Fig. 1, with portions broken out for exposure of important parts which would otherwise be hidden.

The means devised for carrying out doffing automatically under power in a machine such as above described in accordance with the present invention, includes a reversible auxiliary electric motor 100 (Fig. 2) which is mounted on the rear part of the end frame 17. Connected to the shaft 101 of motor 100 by a universal coupling 102 is a shaft 103 whereof the distal end is supported in a floating bearing 104 (see Figs. 7 and 8) pivotally connected to the ends of an arm 105 fixed on a shaft 106. As shown, the shaft 106 is rotatively supported in a bearing bracket 107 within the housing 37, and to its outer protruding end is affixed a hand lever 108. The shaft 103 carries a worm 109 which is normally out with engagement with a worm wheel 110 on the shaft 48 as shown in Fig. 2. Also affixed to the shaft 106 is a cam 111 whereof the edge is engaged by a roller crank arm 112 of a normally open electric safety switch 113. With this arrangement it will be seen that as the hand lever 108 is turned through a half rotation, the shaft 103 will be moved downward and the worm 109 engaged with the worm wheel 110, with concurrent closing of the switch 113 to start the motor 100 for actuation of the secondary actuating mechanism by which the traverse is lowered and raised during the doffing as later on explained.

Figure 9:
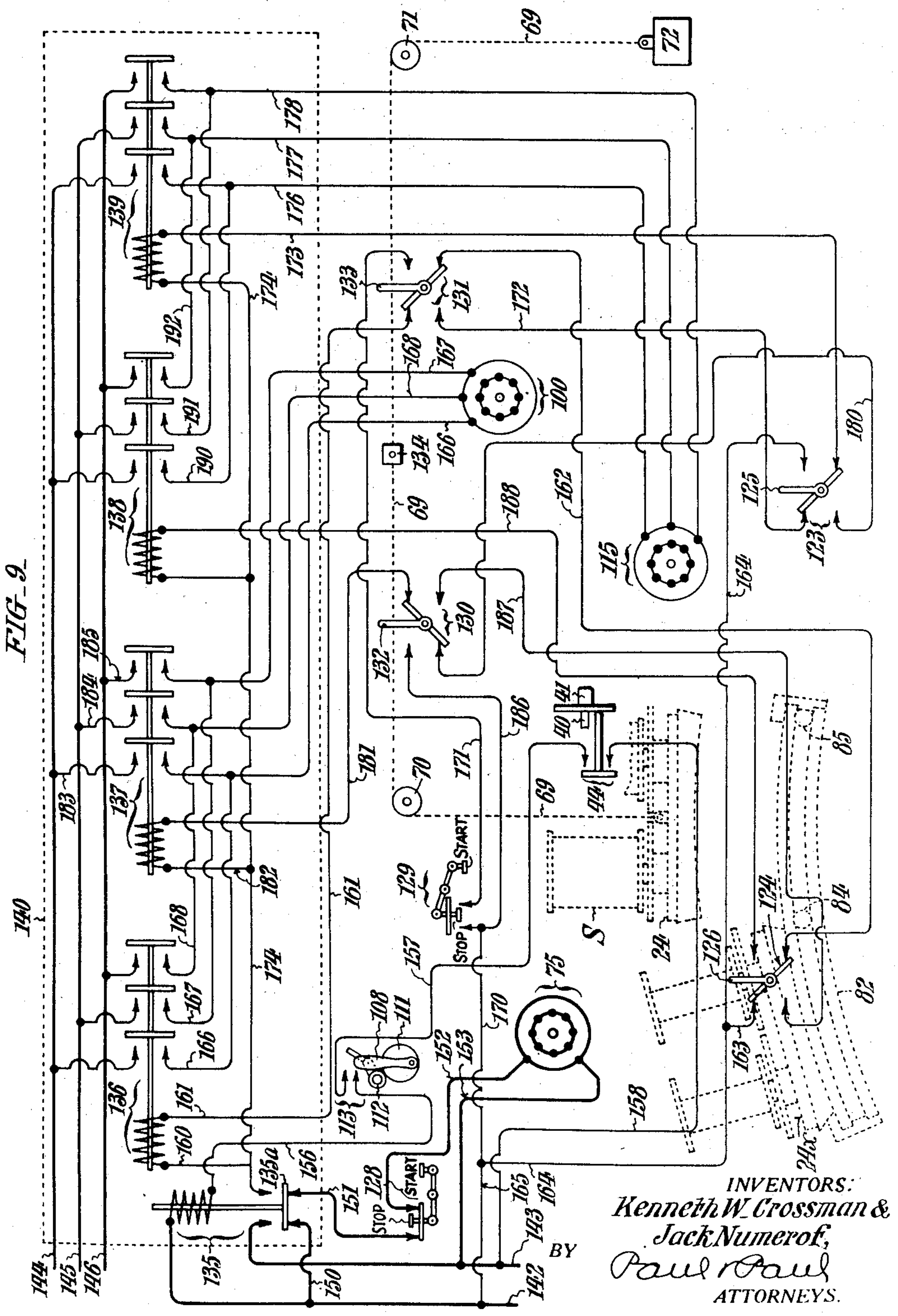
Fig. 9 is a circuit diagram showing various electric appurtenances by which the machine is driven and the doffing automatically carried out under power according to the invention.

For the purpose of driving the transfer carriage actuating mechanism incident to the doffing there is provided a separate reversible auxiliary A. C. electric motor 115 which, see Fig. 2, is supported on a fixed bracket 116 and has a small pulley 117 connected by a belt 118 to a larger pulley 119 on a shaft 120. Affixed to the shaft 120 within the housing 37 is a spur wheel 121 which meshes with a mating spur wheel 122 on shaft 97. Supply of current to the motor 115 is automatically controlled in a manner presently explained by reversing limit switches 123 and 124 whereof the actuating levers 125 and 126 extend into the path of a lug projection 127 on the supplemental spool tray 24x. The main driving motor 75 of the machine is started and stopped by means of a push button switch 128 mounted at the front of the side frame 16, see Figs. 1 and 2. At the front of the other side frame 17 of the machine is a push button switch 129 for controlling current supply to the auxiliary motor 100 during the doffing cycle. For the control of certain circuits presently described there is shown another pair of reversing limit switches 130 and 131 (Fig. 2) which are affixed to the framework of the machine with their actuating arms 132 and 133 in the path of a lug 134 on one of the traverse counter weight chains 69. Other electrical appurtenances employed in addition to the electrical elements thus far described are shown in diagrammatic Fig. 9. This additional equipment includes relays 135, 136, 137, 138 and 139 which in practice are enclosed in a protective box indicated by the dotted lines at 140. The relay 135 is of the double contact type, and the relays 136—139 respectively are of the triple contact type. The main driving motor 75 is operated by current from a single phase A. C. line of which the mains are designated 142 and 143, and the auxiliary motors 100 and 115 from a three phase power line whereof the mains are designated 144, 145 and 146. Fig. 9 shows the condition of the electrical system during the normal operation of the machine in spinning when current is supplied to the main or driving motor 75 from the single phase mains 142 and 143 by way of conductor 150, armature 135a of relay 135, conductor 151, closed push button switch 128, and conductors 152 and 153. At this time the auxiliary motors 110 and 115 are idle and the relays 136—139 are all open. After the desired amount of yarn has been wound upon the spools S on tray 24, the machine attendant opens the switch 128 by pushing the "stop" button thereof when said tray is in its lowest normal position as in Fig. 3 to cut the supply of current to the drive motor 75 whereupon the machine comes to rest.

Preparatory to doffing, the machine attendant is required to throw the hand lever 108 for lowering of the worm 109 on shaft 103 (Fig. 2) into meshing engagement with the worm wheel 110 on shaft 48, and to withdraw and lockout the latch bolt 40 for unclutching of the spur gear 39 (Figs. 2 and 6) from the internal gear 38 and so prevent subsequent operation of the mechanism by which the traverse is normally actuated in the spinning.

Figure 10:
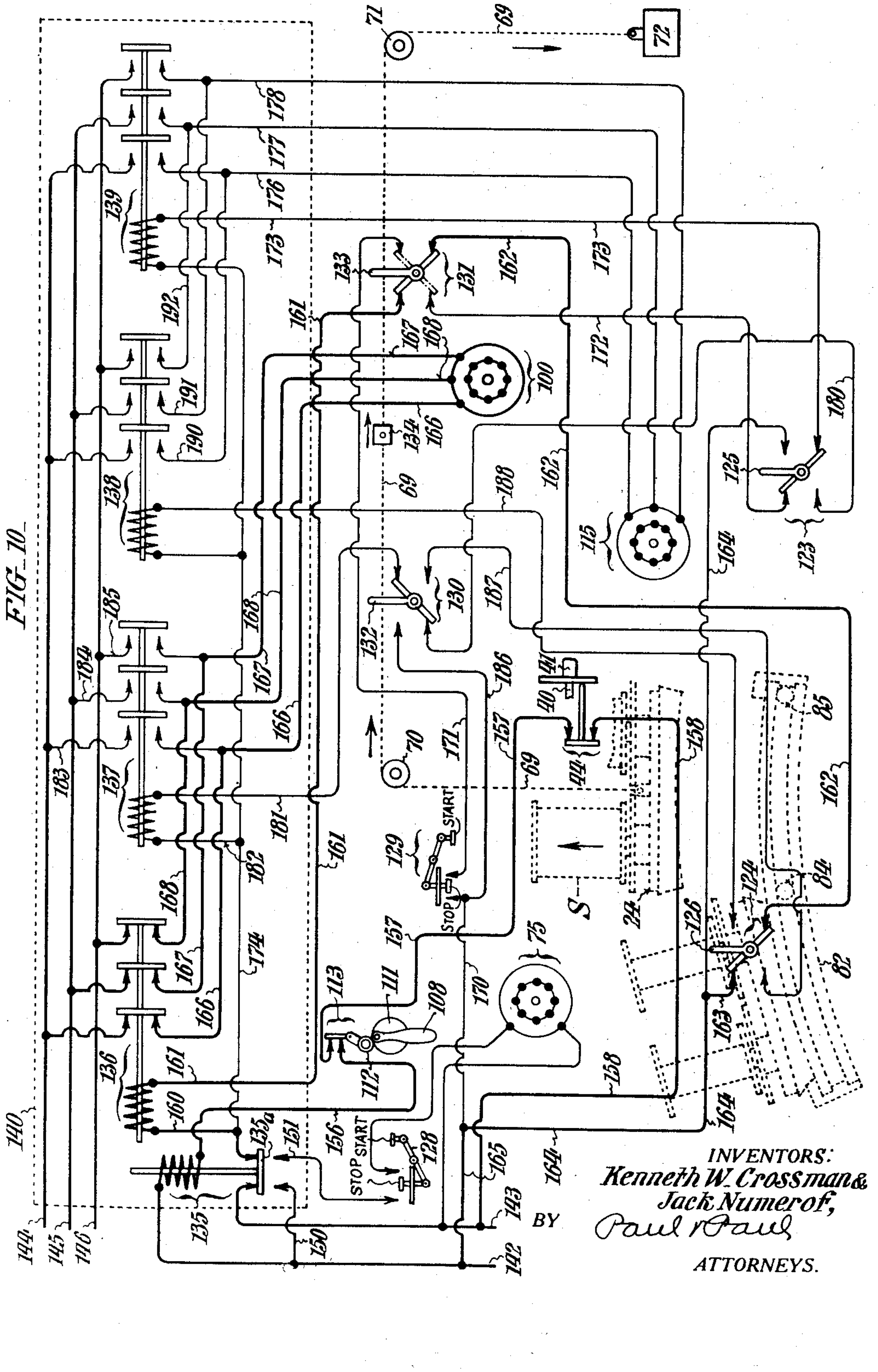
Figs. 10–14 are views like Fig. 9 showing successive stages in the control of a doffing cycle.
Figure 11:
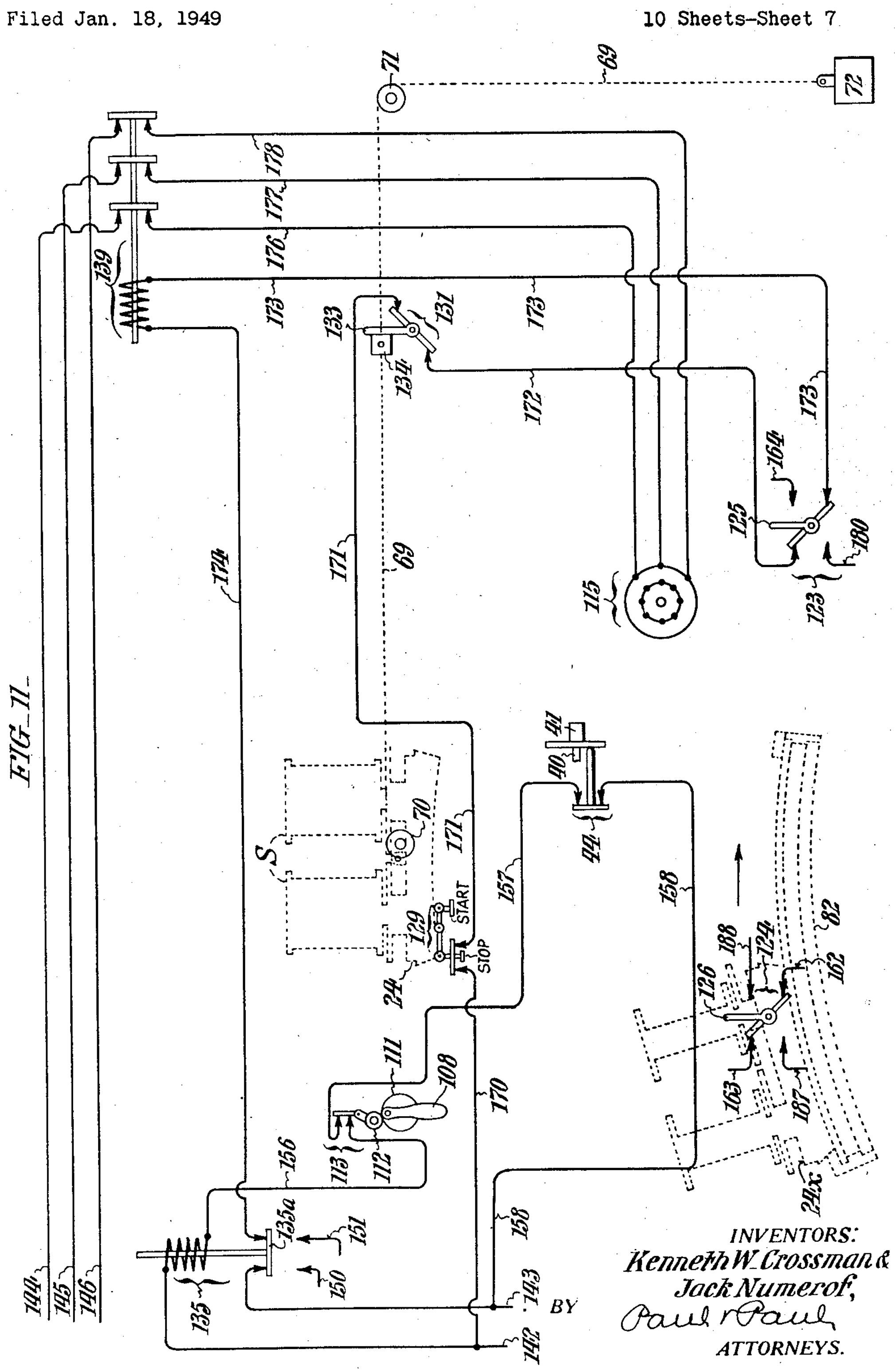
Figure 12:
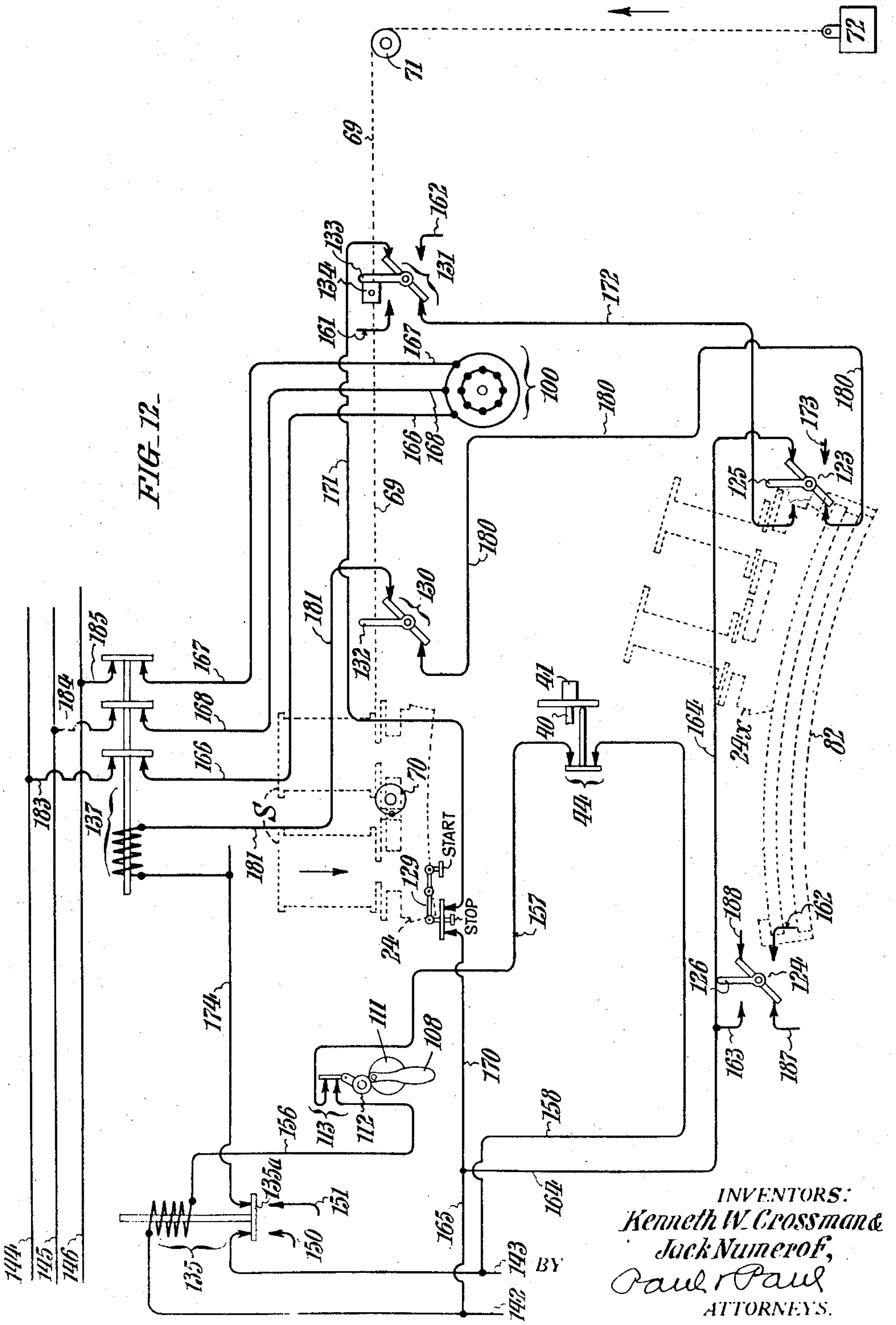
Figure 13:
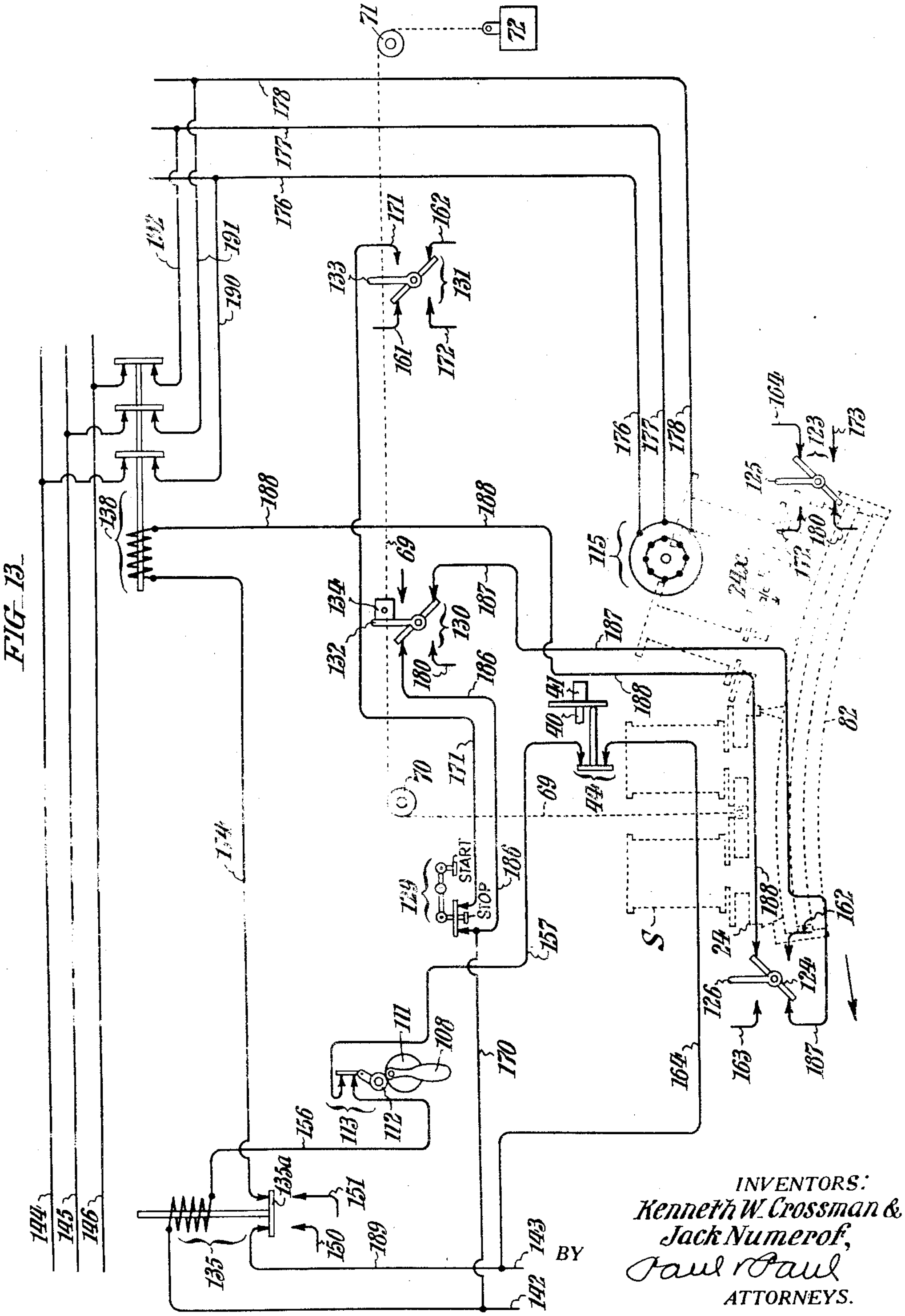
Figure 14:
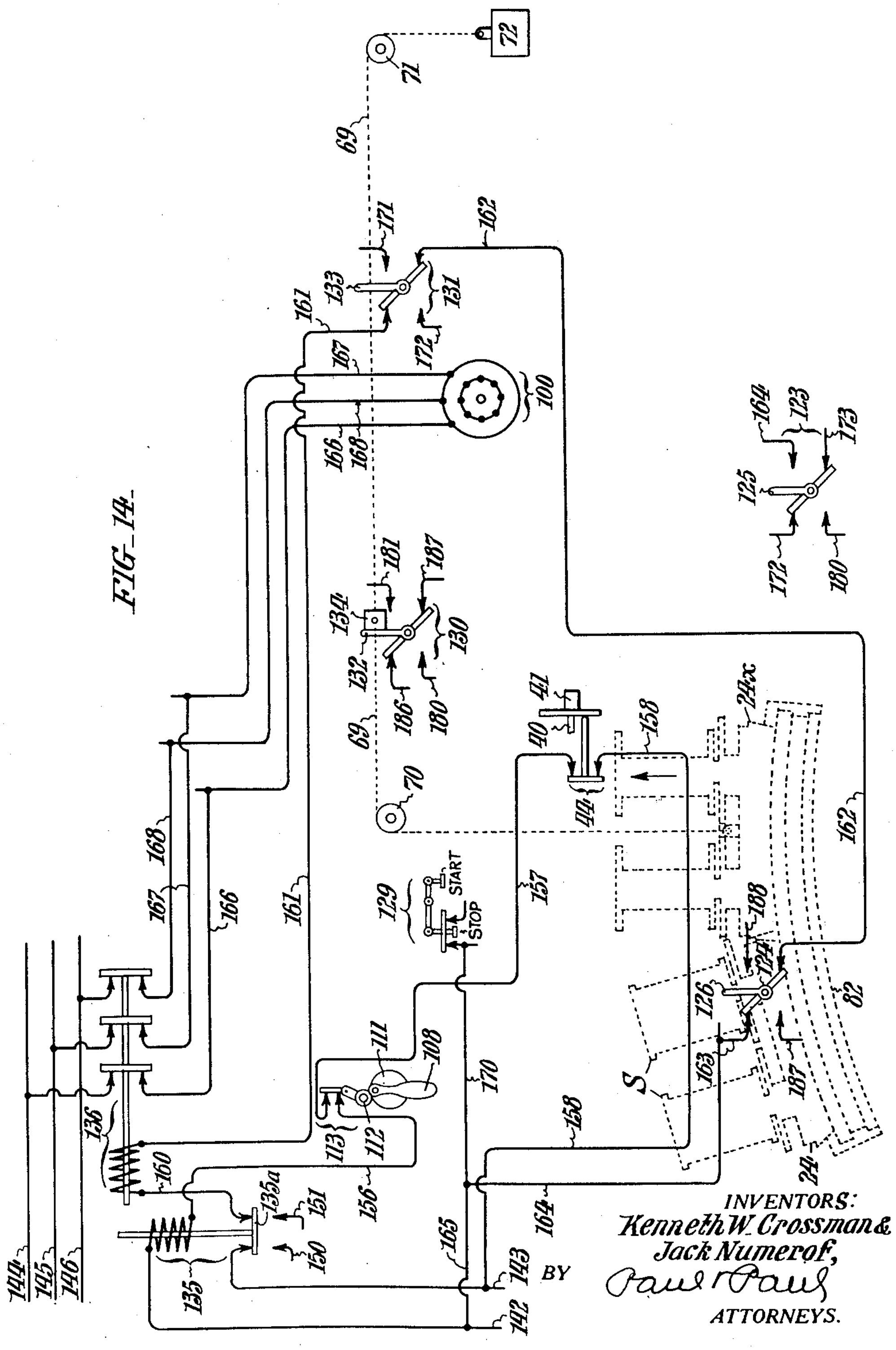

Closing of the safety switches 44 and 113 by the above preparatory steps results in the operation of the relay 135 as will be seen from Fig. 10 to open the circuit to the main drive motor 75 so that the machine cannot be set into motion now by closing the push button switch 128. The closing of relay 135 as just explained is due to current flow in its solenoid coil from the power mains 142, 143, by way of conductor 156, closed safety switch 113, conductor 157, closed safety switch 44 and conductor 158. At the same time, the relay 136 is actuated as a consequence of current flow in its solenoid coil from the power mains 142 and 143 by way of another circuit including the armature 135a of relay 135, conductors 160, 161, limit switch 131, conductor 162, limit switch 124, and conductors 163, 164, 165. As the relay 136 closes, current flows from the three phase mains 144, 145 and 146 to the motor 100 by way of conductors 166, 167 and 168. The shaft 103 is thereby rotated and, through its worm 109, drives the worm wheel 110 from which the motion is transmitted, through the gear train 47, 46, 45 and 39 to the shaft 36 and in turn from the latter to the auxiliary traverse actuating gearing (Fig. 4) to elevate the spool tray 24. As the tray 24 rises, the lug 134 on the balance weight chain (Fig. 10) will eventually engage the lever of reversing limit switch 131 and throw said switch to the dotted line position in Fig. 10. This occurs when the tray 24 has been raised to its highest position in the machine when current flow to the coil of relay 136 is interrupted so that the latter will open and cut the supply of current to the auxiliary motor 100. The entire electrical system thus becomes dormant at this stage, and, in order to proceed with the doffing, the machine attendant is required to push the "start" button of the push button switch 129 as in Fig. 11. By this step, the relay 139 is closed as a consequence of current flow established from the main 142 through conductor 170, switch 129, conductor 171, reversing limit switch 131, conductor 172, reversing limit switch 123, conductor 173 coil of relay 139, conductor 174, and relay switch 135 to main 143. As a result current is supplied to the transfer motor 115 from the three phase mains 144, 145 and 146 through the closed contacts of relay 139 and the conductors 176, 177 and 188. Upon being set in motion, the motor 115 (Fig. 2), by driving the auxiliary actuating mechanism constituted by the gear train 121, 122, 96, 95, 94, 93, 92, 91 89 and 90 causes rotation of the shafts 80 and 81 so that the spur pinions 86 and 87 on the latter successively act upon the rack 88 on the supplemental empty spool tray 24x which is accordingly moved inward, together with the transfer carriage slides 82 to the position shown in broken lines in Fig. 3 beyond the path of the traverse. As the tray 24x completes its inward travel, it throws the reversing limit switch 124 to the position shown in Fig. 12 whereupon the relay 137 is closed and current flow established to the traverse motor 100 which now runs in the opposite direction to effect lowering of the filled spool tray 24. The operating current flow to the relay 137 under this condition is from the main 142 conductors 165, 164, reversing limit switch 123, conductor 180, limit switch 130 conductor 181, coil of relay 137, conductor 174 and contact 135a of relay 135, to the main 143; while the current flow to the traverse motor 100 is from the three phase mains 144, 145 and 146 by way of conductors 183, 184 and 185 and the connecting conductors 166, 167 and 168. Under the drive of the traverse gear mechanism, the traverse brackets 27 are moved downward until the spool tray 24 is deposited upon the transfer bars 82, when the lug 134 in the counterweight chain 69 will throw the reversing limit switch 130 as in Fig. 13, whereupon the relay 138 will be closed and current flow established to the transfer motor 115 which this time will be driven in the reverse direction. The movement imparted to the traverse at this time is in excess of its normal downward travel during the spinning. In order to permit this, the stud, 58 (Fig. 5), which ordinarily cooperates with the oscillating member 57, recedes into the deep portion of the cam way 68 on the supplemental transverse frame 31. The current flow to the relay 138 will be from the main 142 through conductors 170 and 186, reversing limit switch 130, conductor 187, reversing limit switch 124, conductor 188, coil of relay 138, conductor 174, contact 135a of relay 135, and conductor 189 to main 143; while the motor 115 will be supplied with current from the mains 144, 145 and 146 through conductors 190, 191 and 192 which latter connect respectively with conductors 176, 177 and 178. With the auxiliary motor 115 now running to drive the transfer actuating gear mechanism, the transfer slides 82 will be moved outward carrying with them the filled spool tray 24 and the substitute empty spool tray 24x, whereby the former will be moved to unloading position and the latter to position under the flyers 14. Upon completion of this movement, the reversing limit switches 123 and 124 will be re-set in their original positions with consequent automatic stoppage of the auxiliary motor 115 and placement of the system in the condition in which it is shown in Fig. 14, when the auxiliary motor 100 will be automatically re-started through closing of relay 136 in the same manner as described in connection with Fig. 10 to raise the traverse for elevation of the tray 24x with the empty spools into operative position relative to the flyers 14. As the traverse begins its ascent, the machine attendant is required to turn the clutch pin 40 (Fig. 6) by means of the grasp 41, back to its original position. Upon full elevation of the traverse, the clutch pin 40 will be automatically thrust inward by its spring 42 to re-engage the hole in the internal gear 38 in readiness for the gear mechanism in Fig. 3 to take over and operate the traverse during the next spinning cycle. The auxiliary motor 100 is automatically stopped by opening of the switch 44 as re-clutching by the pin 40 takes place, whereupon the entire electrical control system is rendered dormant as in Fig. 9. At this stage, the machine attendant opens the switch 113 by turning up the handle 108, with incidental withdrawal of the worm 109 on shaft 103 from engagement with the worm wheel 110 as in Fig. 2. The yarns or twines at the filled spools on the ejected tray 24 are then severed, and the cut ends leading from the smoothing guides 12 attached to the empty spools on the fresh tray 24, and the main motor 75 finally re-started by pressing the "start" button of manual switch 128 to initiate another spinning cycle. As the new spinning cycle proceeds, the filled spools are removed from ejected tray 24 and replaced by empty ones in preparation for the next doffing cycle.

In addition to the function already described, the switches 44 and 113 serve as safety means when open as shown in Fig. 9 and is normally the case to prevent starting of a doffing cycle while the main motor 75 is running to drive the machine with the result that the various mechanisms of the organization are protected against injury and/or derangement.

Having thus described our invention, we claim:

1. In a spinning machine or the like, a main power drive means; a horizontally-arranged group of flyers rotative about individual vertical axes; a vertically-reciprocatory traverse for supporting a tray with upright spools in axial alignment with the respective flyers, transfer means with a carriage and mechanism for moving the carriage for doffing purposes crosswise of the machine beneath the traverse; primary mechanism for normally reciprocating the traverse relative to the flyers during the spinning, secondary actuating mechanism for lowering and raising the traverse during doffing, and instrumentalities for carrying out a doffing cycle upon stopping of the machine at the completion of each spinning operation including separate reversible power drive means for respectively actuating the auxiliary traverse operating mechanism and the transfer carriage operating mechanism, manual means for starting the transfer carriage drive means for transfer of a supplemental tray with empty spools inward of the machine beyond the path of the traverse, means automatically operated by the transfer carriage as it reaches the end of its inward travel to stop the transfer carriage drive means and to start the traverse drive means for lowering the traverse and deposit of the filled tray into the transfer carriage, means automatically operated by the carriage upon deposit of the filled tray to stop the traverse drive means and to start the transfer carriage drive means for outward movement of the carriage to discharge the filled tray and to concurrently position the supplemental tray beneath the flyers, means automatically operated by the carriage drive means to then stop the carriage drive means and start the traverse drive means for raising the traverse and the supplemental tray thereon to spinning position relative to the flyers, and means automatically operated by the traverse when it has been so raised to stop the traverse drive means.

2. A spinning machine or the like according to claim 1, further including safety means to prevent starting of the machine during doffing cycles, and to prevent operation of the doffing means during spinning cycles.

3. A spinning machine or the like according to claim 1, further including manual means for connecting the secondary traverse actuating mechanism to its drive means after stopping the machine at the completion of a spinning cycle, and means operated by said manual means to prevent operation of the main drive means during doffing cycles.

4. A spinning machine or the like according to claim 1, further including manual means for disconnecting the primary traverse actuating mechanism from the main drive means upon stopping of the machine upon completion of a spinning cycle, and means operated by said manual means to prevent operation of the main drive means during doffing cycles.

5. In a spinning machine or the like, a main electric drive motor, manual switch means for starting and stopping the main motor, a horizontally-arranged group of flyers rotative about individual vertical axes, a vertically-reciprocatory traverse for supporting a tray with upright spools in axial alignment with the respective flyers, transfer means with a carriage and mechanism for moving the carriage for transfer purposes crosswise of the machine beneath the traverse, primary means for normally reciprocating the traverse relative to the flyers during the spinning, secondary actuating mechanism for lowering and raising the traverse during doffing, and means for carrying out a doffing cycle upon stopping of the machine at the completion of each spinning operation, including separate reversible electric motors for respectively actuating the secondary traverse actuating mechanism and the transfer actuating mechanism, manual switch means for starting the transfer carriage motor for transfer of a supplemental tray with empty spools inward of the machine beyond the path of the traverse, switch means automatically operated by the transfer carriage as it reaches the end of its inward travel to stop the transfer carriage motor and to start the traverse motor for lowering the traverse and deposit of the filled tray upon the transfer carriage, switch means automatically operated upon deposit of the filled tray to stop the traverse motor and to start the transfer carriage motor for outward movement of the carriage to discharge the filled tray and to position the supplemental tray beneath the flyers, other switch means automatically operated by the transfer carriage to stop the transfer carriage motor and start the traverse motor for raising the traverse and elevating the supplemental tray to spinning position relative to the flyers, and still other switch means automatically operated by the traverse when the latter has been so raised to stop the traverse motor.

6. A spinning machine or the like according to claim 5, further including safety means to prevent starting of the machine during doffing cycles, and to prevent operation of the doffing means during spinning cycles.

7. A spinning machine or the like according to claim 5, further including manual means for mechanically connecting the secondary traverse actuating mechanism from the traverse motor after stopping of the machine at the completion of a spinning cycle, and a normally closed switch opened by operation of said manual means to prevent current supply to the main motor during doffing cycles.

8. A spinning machine or the like according to claim 5, further including manual means for mechanically disconnecting the primary traverse actuating mechanism upon stopping of the machine after completion of a spinning cycle, and a normally-closed switch opened by operation of said manual means to prevent current supply to the main motor during doffing cycles.

KENNETH W. CROSSMAN.
JACK NUMEROF.

REFERENCES CITED

The following references are of record in the file of this patent:

UNITED STATES PATENTS

| Number | Name | Date |
|---|---|---|
| 1,543,618 | Prince-Smith et al. | June 23, 1925 |
| 1,695,659 | Mackie | Dec. 18, 1928 |
| 1,823,374 | Porter | Sept. 15, 1931 |
| 2,076,423 | Anderson | Apr. 6, 1937 |

FOREIGN PATENTS

| Number | Country | Date |
|---|---|---|
| 485,303 | Germany | Oct. 29, 1929 |